(12) United States Patent
Sugiyama et al.

(10) Patent No.: US 10,697,610 B2
(45) Date of Patent: Jun. 30, 2020

(54) RESIN MOLDED PRODUCT

(71) Applicant: Koito Manufacturing Co., Ltd., Tokyo (JP)

(72) Inventors: Kenta Sugiyama, Shizuoka (JP); Masashi Katayama, Shizuoka (JP); Eiji Matsubara, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/261,710

(22) Filed: Jan. 30, 2019

(65) Prior Publication Data
US 2019/0249844 A1 Aug. 15, 2019

(30) Foreign Application Priority Data
Feb. 13, 2018 (JP) .................................. 2018-023150

(51) Int. Cl.
| | |
|---|---|
| *B32B 7/02* | (2019.01) |
| *F21V 3/06* | (2018.01) |
| *B29C 45/00* | (2006.01) |
| *F21V 3/02* | (2006.01) |
| *B29L 31/30* | (2006.01) |
| *B29L 11/00* | (2006.01) |

(52) U.S. Cl.
CPC .......... *F21V 3/062* (2018.02); *B29C 45/0001* (2013.01); *B29C 45/0025* (2013.01); *F21V 3/02* (2013.01); *B29C 45/0046* (2013.01); *B29C 2045/0027* (2013.01); *B29K 2995/0026* (2013.01); *B29K 2995/0094* (2013.01); *B29K 2995/0097* (2013.01); *B29L 2011/00* (2013.01); *B29L 2031/30* (2013.01)

(58) Field of Classification Search
CPC ........ B29C 2045/0027; B29C 45/0001; B29C 45/0025; B29C 45/0046; B29K 2995/0026; B29K 2995/0094; B29K 2995/0097; B29L 2011/00; B29L 2031/30; F21V 3/02; F21V 3/062
See application file for complete search history.

(56) References Cited

U.S. PATENT DOCUMENTS

2011/0026268 A1* 2/2011 Omura ................ B29C 45/0025
362/548

FOREIGN PATENT DOCUMENTS

JP 2017-052105 A 3/2017

* cited by examiner

*Primary Examiner* — Lawrence D Ferguson
(74) *Attorney, Agent, or Firm* — Abelman, Frayne & Schwab

(57) ABSTRACT

A resin molded product produced by injection molding includes: a gate mark formed on a non-design surface; and a step provided so as to intersect with a flow of a resin injected from a gate. When a flow distance of the resin from the gate mark to an end portion of the resin molded product is L [mm], and a thickness of the resin molded product is t [mm], the resin molded product is configured to have L/t of 185 or more, and a tangential angle of the step is 5° to 30°.

14 Claims, 6 Drawing Sheets

RESIN MOLDED PRODUCT

CROSS-REFERENCE TO RELATED APPLICATIONS

This application is based on and claims priority from Japanese Patent Application No. 2018-023150, filed on Feb. 13, 2018 with the Japan Patent Office, the disclosure of which is incorporated herein in its entirety by reference.

TECHNICAL FIELD

The present disclosure relates to a resin molded product.

BACKGROUND

In the related art, a resin molded product using an injection molding is known. The resin molded product is used in various fields, and, for example, adopted as a component such as a transparent cover or a lens of a vehicle lamp. Further, with respect to such component, a thinning is required from a viewpoint of weight lightening or material cost reduction.

However, when a thinned component is produced by injection molding, since the cooling rate of the thinned component is higher than that of a thick component, it is necessary to fill a mold with a resin material at a high speed. Therefore, depending on the inner surface shape of the mold, the resin filled at a high speed may not follow the unevenness of the inner surface of the mold, so that a portion that is not filled with the resin may be formed in an uneven portion.

In the unfilled portion, the moisture or volatile components contained in the air and the molten resin exists in a gas state, and as the injection of the resin proceeds, the unfilled portion is compressed and the gas escapes out of the mold along a molding surface. Then, the traces of the gas escaping the mold appear on a surface of the molded product as silver streaks (silver stripe streak), so that the appearance may be deteriorated.

Therefore, in order to suppress the occurrence of such streaks, a front surface cover has been devised in which a gate mark is provided on a surface side of a part of the translucent front surface cover, and a continuous surface on which a knurled unevenness is not formed is provided at a position on a rear surface side facing the gate mark (see, for example, Japanese Patent Laid-Open No. 2017-052105).

SUMMARY

However, the inventor of the present application has studied intensively, and as a result, has found that the uneven shape provided on the surface of the resin molded product largely affects the occurrence of the streaks described above, and has reached an aspect of the possibility of suppressing the occurrence of streaks by devising an uneven shape of the resin molded product.

The present disclosure has been made in consideration of these circumstances. The present disclosure is, for example, to provide an inventive technology of suppressing appearance deterioration of a resin molded product using injection molding.

In order to solve the above problems, a resin molded product according to an aspect of the present disclosure is a resin molded product produced by injection molding, and includes a gate mark formed on a non-design surface; and a step provided so as to intersect with a flow of a resin injected from a gate. When a flow distance of the resin from the gate mark to an end portion of the resin molded product is L [mm], and a thickness of the resin molded product is t [mm], the resin molded product is configured to have L/t of 185 or more, and a tangential angle of the step is 5° to 30°.

According to the aspect, when the resin flows so as to intersect with the step, the resin is easily filled following the shape of the step. Therefore, for example, it is possible to suppress deterioration in appearance of a design surface of the resin molded product due to traces when the air remaining in a concave portion of the step is discharged.

The step may be formed on a transparent design surface. Therefore, it is possible to suppress deterioration in appearance of the transparent design surface where deterioration in appearance is conspicuous.

The step may have a bottom of the concave portion having a curvature radius R of 0.2 mm or more. Therefore, when the resin is filled, the resin easily follows the shape of the step.

The resin molded product may have thickness t of 1.0 to 2.7 mm. Therefore, it is possible to suppress deterioration in appearance of a thinned resin molded product that requires being filled at high speed during injection molding.

A component may have a length direction of 450 mm or more. Therefore, it is possible to suppress deterioration in appearance of a large resin molded product that is required to be filled at a high speed during the injection molding.

The step may be configured such that an angle between a length direction of the step and a flowing direction of the resin is 60° to 90°. Alternatively, the step may be configured such that an angle between a length direction of the step and a flowing direction of the resin is 75° to 90°. Therefore, since deterioration in appearance may be suppressed even in an arrangement of steps where deterioration in appearance is likely to occur, a degree of freedom of arrangement of steps is improved.

Any combination of the above-described constituent elements, and those obtained by converting expressions of the present disclosure among methods, apparatuses, and systems are also effective as aspects of the present disclosure.

According to the present disclosure, deterioration in appearance of a resin molding product using injection molding may be suppressed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
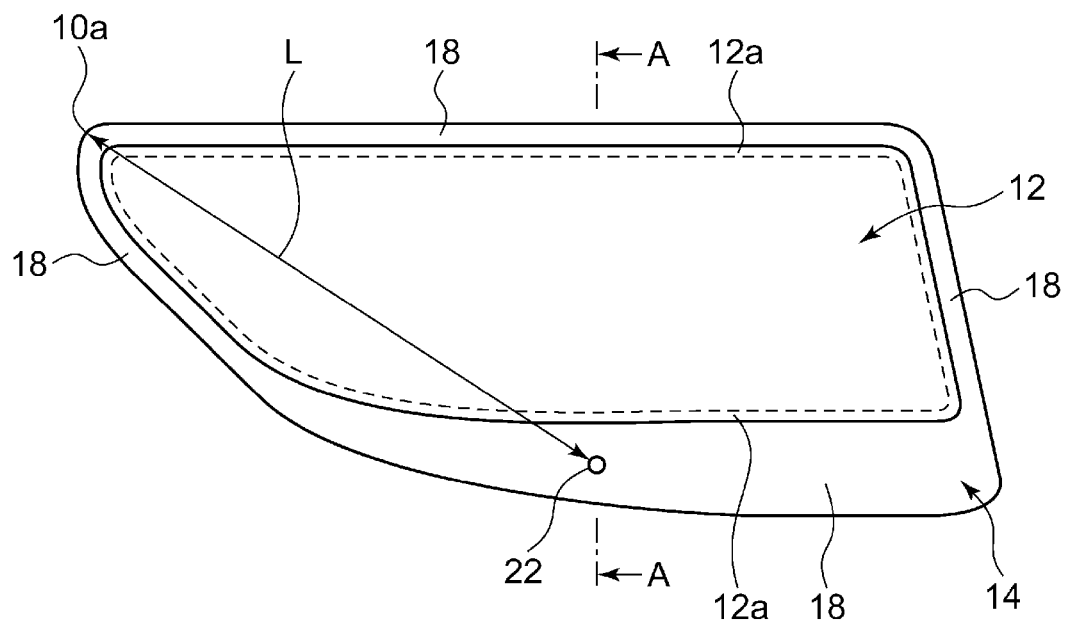
FIG. 1 is a front view of a front surface cover according to the present embodiment.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, embodiments for implementing the present disclosure will be described in detail with reference to the drawings or the like. Further, in the description of the drawings, the same elements are denoted by the same reference numerals and redundant explanation will be properly omitted.

A resin molded product according to the present disclosure is suitable for a thin and large transparent member, and for example, may be applied as a transparent front surface cover that constitutes a vehicle lamp. Hereinafter, the resin molded product according to the present embodiment will be described as a front surface cover of a vehicle lamp as an example.

Figure 2:
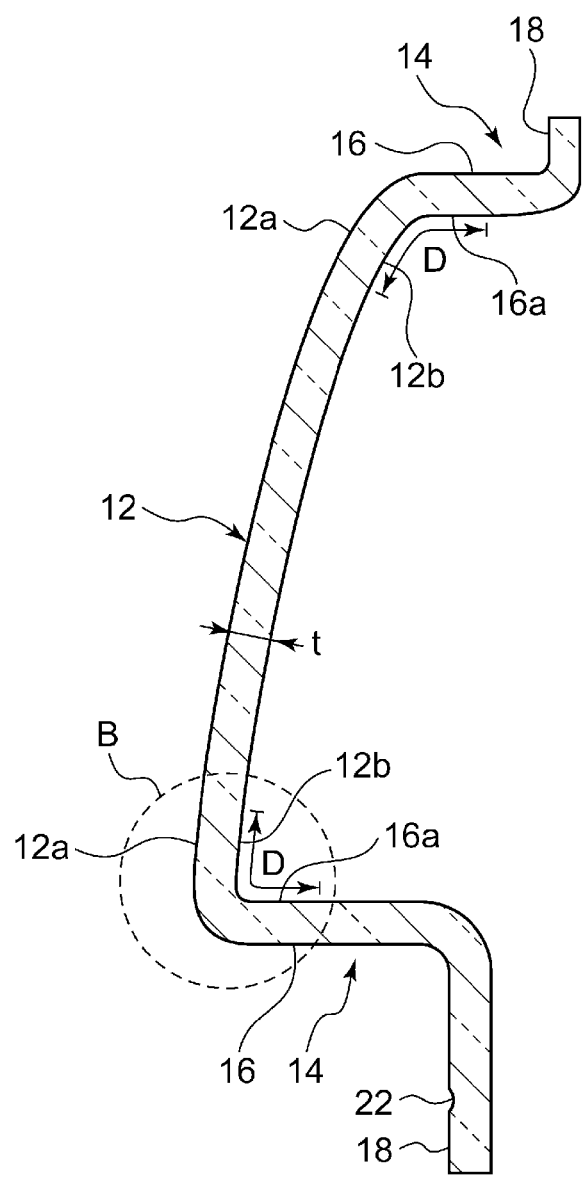
FIG. 2 is a cross-sectional view of the front surface cover illustrated in FIG. 1 taken along line A-A.
Figure 3:
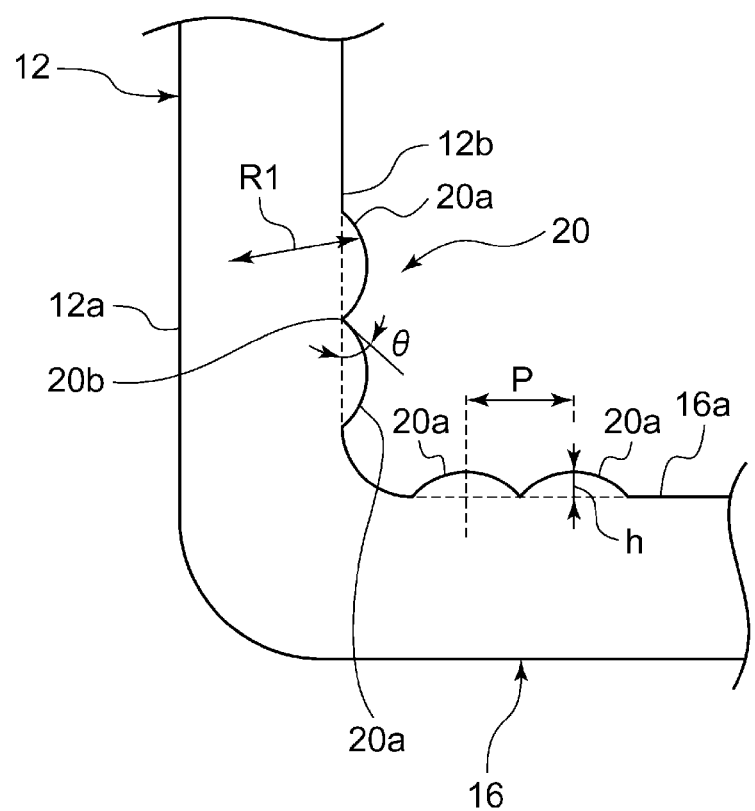
FIG. 3 is an enlarged cross-sectional view of a region B of the front surface cover illustrated in FIG. 2.

FIG. 1 is a front view of a front surface cover according to the present embodiment. FIG. 2 is a cross-sectional view of the front surface cover illustrated in FIG. 1 taken along line A-A. FIG. 3 is an enlarged cross-sectional view of a region B of the front surface cover illustrated in FIG. 2.

A front surface cover 10 is a resin molded product produced by injection molding, and is made of a transparent synthetic resin (e.g., a polycarbonate resin or an acrylic resin) that is lightweight and excellent in strength. As illustrated in FIG. 1 or 2, the front surface cover 10 includes a front surface portion 12 that is a design surface region, and an annular peripheral edge portion 14 that is bent and extends rearward from the outer periphery of the front surface portion 12.

The peripheral edge portion 14 is constituted by an annular standing wall 16 that is bent and extends rearward from the outer periphery of the front surface portion 12, and a flange portion 18 that is bent and extends outward at a rear end portion of the standing wall 16. The width of the flange portion 18 at the left and right side surfaces and the upper surface of the front surface cover 10 (the extending length from the standing wall 16) is formed to be narrow, and the width thereof at the lower surface is formed to be wide. Then, the front surface cover 10 is assembled to a lamp body via the flange portion 18 to cover an entire front surface of a lamp chamber.

A knurled unevenness 20 (including, specifically, flat type knurls in which knurling mountains 20a in a semi-cylindrical shape are continued at equal pitches in a circumferential direction of the front surface portion 12) is provided in a range indicated by reference numeral D in FIG. 2, on a rear surface 12b of an edge portion 12a of the front surface portion 12 and a rear surface 16a on the front surface portion side of the standing wall 16. The standing wall 16 or the flange portion 18 that is a non-design surface is configured not to be a plain state (to be a non-plain state).

Further, when viewed the front surface cover 10 illustrated in FIG. 1 from the front side, a gate mark 22 that is attached at the time of molding the front surface cover 10 by a mold (to be described later) (see, e.g., FIG. 4) is provided at a center portion in the left and right direction of the surface of the lower flange portion 18. Although the gate mark 22 illustrated in FIG. 1 is provided at the center portion in the left and right direction of the surface of the flange portion 18, when the gate position is a side gate provided at the lower end portion of the flange portion 18, it becomes difficult to visually recognize the gate mark from the front direction of the design surface.

Figure 4:
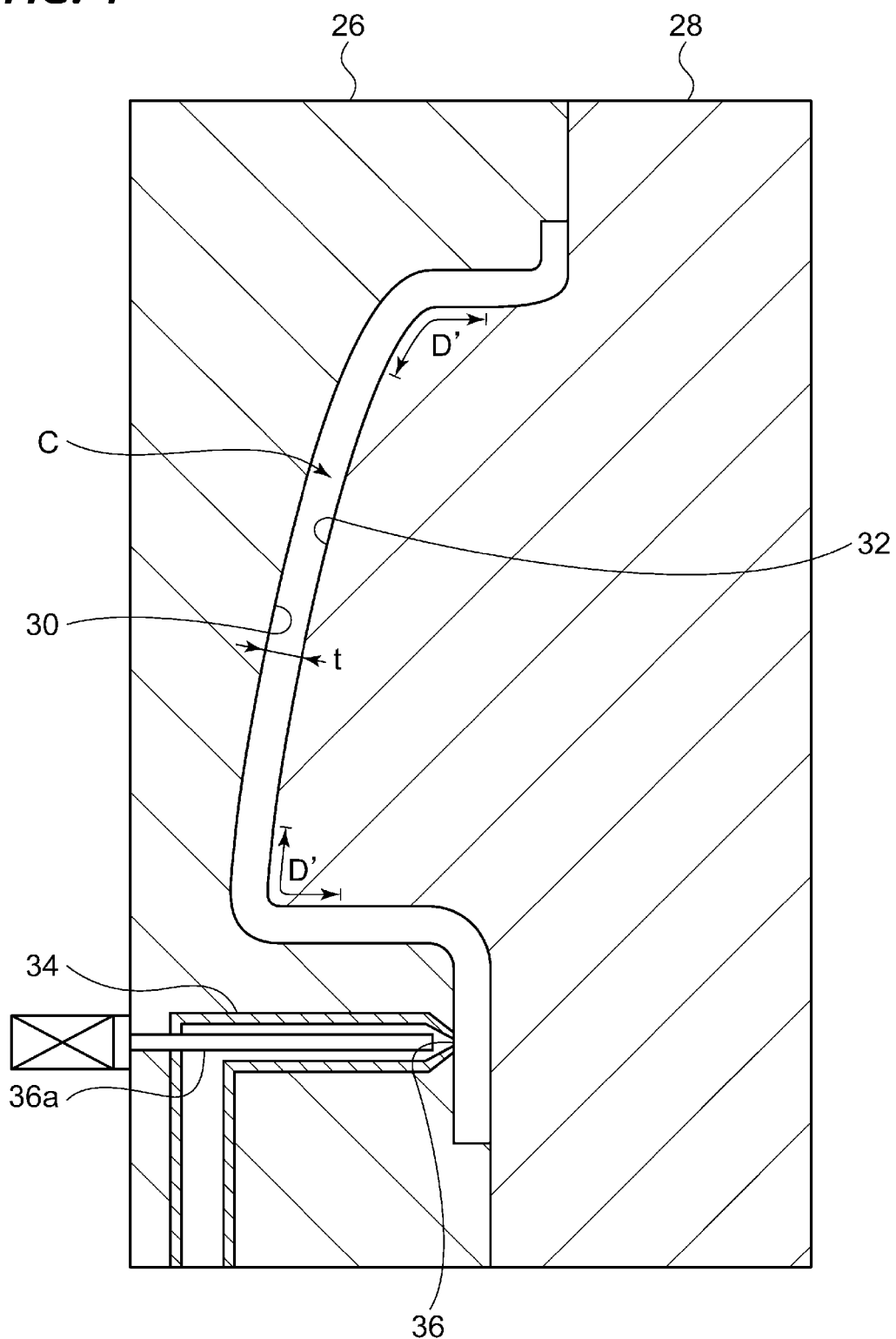
FIG. 4 is a vertical cross-sectional view of a mold device for injection molding the front surface cover according to the present embodiment.

Subsequently, a mold device 24 that molds the front surface cover 10 which is an injected resin molding product according to the present embodiment is described with reference to FIG. 4. FIG. 4 is a vertical cross-sectional view of a mold device for injection molding the front surface cover according to the present embodiment.

The mold device 24 is constituted by a cavity side mold 26 on a fixed side, and a core side mold 28 on a movable side that is capable of moving in directions toward/away from the cavity side mold 26. A cavity C that corresponds to the front surface cover 10 is defined with a molding surface 30 of the cavity side mold 26 and a molding surface 32 of a core side mold 28 by clamping the cavity side mold 26 and the core side mold 28. Thickness of a main part of the cavity C is in a range of 2 to 5 mm, more preferably less than 3.0 mm.

A hot runner 34 that is opened at a predetermined position (a position corresponding to the center portion of the left and right direction of the lower flange portion 18) of the front surface cover 10 in the cavity C is arranged in the cavity side mold 26. The opened portion of the hot runner 34 to the cavity C is provided with a valve gate 36. The valve gate includes a valve pin 36a that is inserted and penetrated into the hot runner 34 and is able to perform an advance and retraction operation in an axial direction. The valve gate 36 is opened/closed by moving the valve pin 36a frontward and backward.

Figure 5:
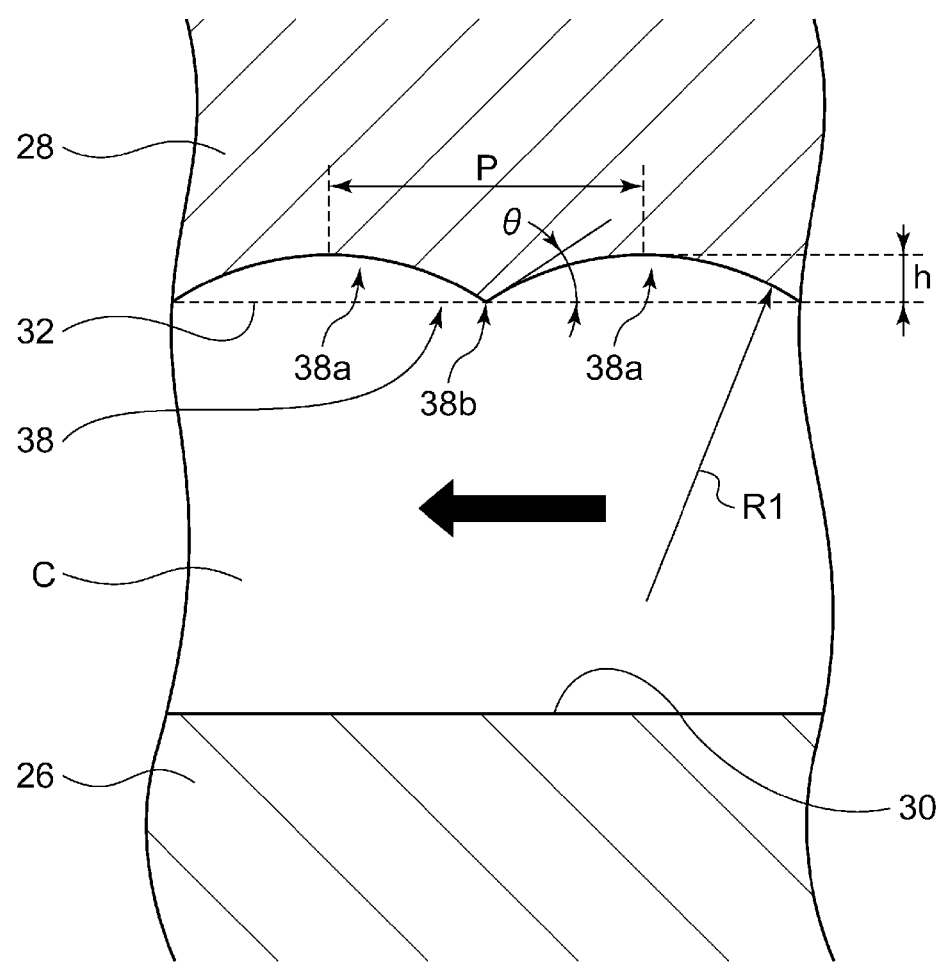
FIG. 5 is an enlarged view of an uneven portion on a molding surface of a mold for forming a step according to the present disclosure.
Figure 6A:
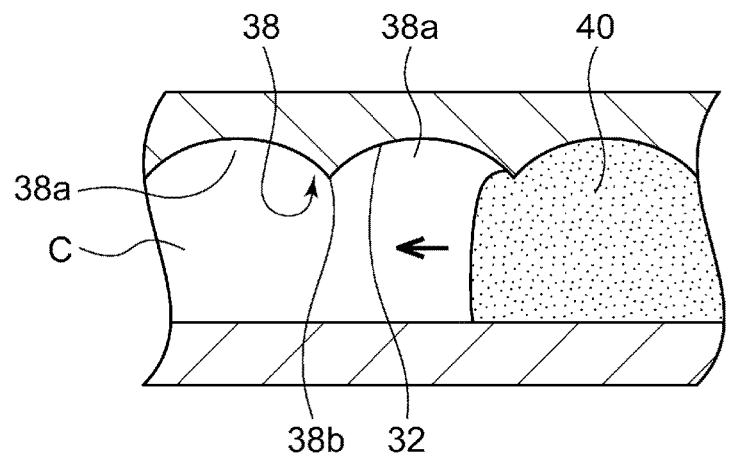
FIGS. 6A to 6D are schematic views for explaining following property of the resin in a cavity during performing injection molding at high speed.
Figure 6B:
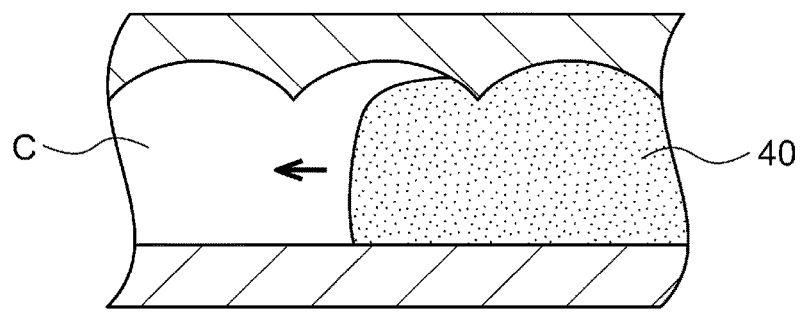
Figure 6C:
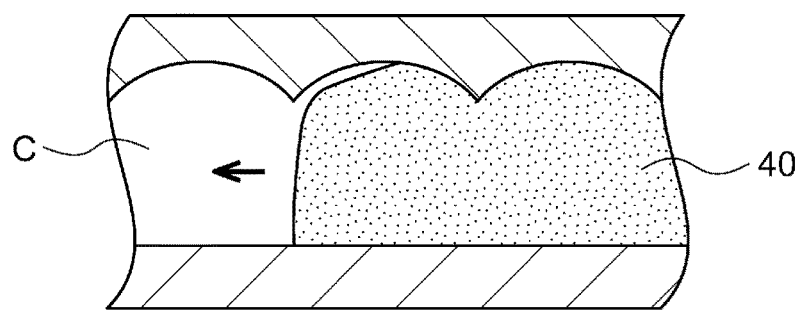
Figure 6D:
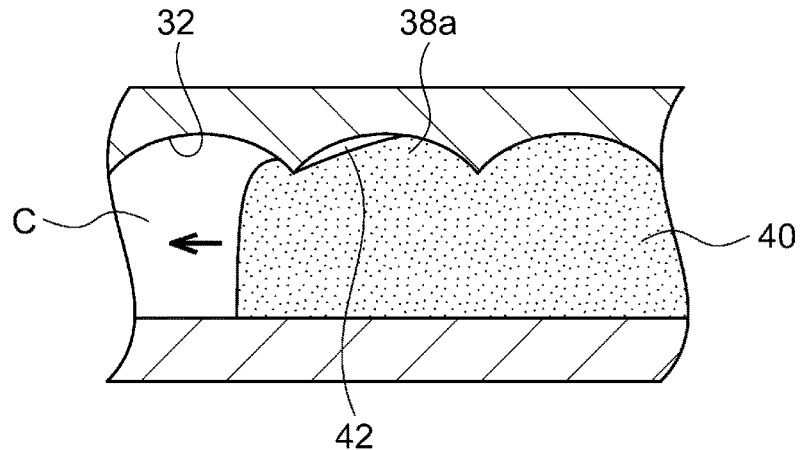

An uneven portion for molding the above described knurled unevenness 20 is formed in a region corresponding to the rear surface 12b of the edge portion 12a of the front surface portion 12 and a region corresponding to the rear surface 16a on the front surface side of the standing wall 16 (regions indicated by reference numeral D' in FIG. 4), of the molding surface 32 of the core side mold 28 defining the cavity C. FIG. 5 is an enlarged view of the uneven portion on the molding surface of the mold for forming a step according to the present disclosure.

As illustrated in FIG. 5, an uneven portion 38 (a concave recess 38a and a convex line 38b) for forming the knurled unevenness 20 is formed in a part of the molding surface 32 of the core side mold 28. The concave recess 38a corresponds to the knurling mountain 20a and a pitch and a depth of the concave recess 38a corresponds to the pitch p and the depth h of the knurling mountain 20a.

Subsequently, a state where the resin is being filled in a mold will be described. FIGS. 6A to 6D are schematic views for explaining following property of the resin in a cavity during performing injection molding at high speed.

When the uneven portion 38 (38a, 38b) is formed on a part of the molding surface 32, an unfilled portion 42 of the resin is formed in the concave recess 38a, since the resin 40 injected from the valve gate 36 to the cavity C is not able to flow smoothly with respect to the uneven portion (38) (the convex line 38b). The air stagnated in the unfilled portion 42 occurs silver streaks as traces when the air is discharged from the concave recess 38a at a timing with a resin 40 to be filled thereafter.

The front surface cover 10 according to the present embodiment includes the knurled unevenness 20 as a step provided so as to intersect with a flow of the resin 40 injected from the valve gate 36, and when a flow distance of the resin from the gate mark 22 to the end portion 10a of the front surface cover 10 is L [mm] (see, e.g., FIG. 1), and the thickness of the main part of the front surface cover 10 is t

[mm] (see, e.g., FIG. 2), the front surface cover 10 is configured to have L/t of 185 or more.

As a result of intensive studies on the front surface cover 10 having such a shape and a size by the present inventor, as illustrated in FIG. 5, the inventor has found that a tangential angle θ of the step may be 5° to 30°. Here, the tangential angle θ refers to an angle between the molding surface 32 and a tangential line that follows a bottom shape of the concave recess 38a passing through the apex of the convex line 38b of the uneven portion 38 on a plane perpendicular to a direction in which the concave recess 38a extends as illustrated on the paper surface illustrated in FIG. 5. In other words, it may be an angle between the rear surface 12b and a tangential line that follows a surface shape of the knurling mountain 20a passing through the deepest portion 20b between the knurling mountains 20a on a plane perpendicular to a direction in which the knurling mountain 20a extends as illustrated on the paper surface illustrated in FIG. 3.

According to the study of the present inventor, in molding a thinned resin molded product having a thickness t of 2 mm, and L/t of 240 in a main part, silver streaks are suppressed from occurring on the design surface of the front surface portion 12 when the knurled unevenness 20 (the uneven portion 38 on the molding surface 32) has a tangential angle θ of 25° or 30°. Meanwhile, when the thinned resin molded product was molded under the condition that the tangential angle θ is 35°, silver streaks were likely to occur.

In this manner, when the resin 40 flows so as to intersect with the uneven portion 38 of the molding surface 32, the resin 40 is easily filled along the shape of the step by setting the tangential angle of the step to 5° to 30°. Therefore, for example, it is possible to suppress deterioration in appearance of the design surface of the front surface cover 10 due to traces when the air remaining in a concave recess 38a of the step is discharged.

Further, as illustrated in FIG. 3, a part of the knurling mountain 20a is formed on the rear surface 12b of the edge portion 12a of the front surface portion 12 that is a transparent design surface. The front surface cover 10 according to the present embodiment is able to suppress deterioration in appearance of the transparent design surface where deterioration in appearance is conspicuous in this manner.

Further, the knurling mountain 20a has a curvature radius R of the bottom (the deepest portion 20b) of the concave portion of 0.2 mm or more. More preferably, the curvature radius R is 0.5 mm or more. Therefore, when the resin 40 is filled, it is easy to follow the shape of the uneven portion 38 of the core side mold 28.

Further, the thickness t of the main part of the front surface cover 10 according to the present embodiment is 1.0 to 2.7 mm preferably, the thickness t may be 2 to 2.5 mm. Therefore, it is possible to suppress deterioration in appearance of a thinned front surface cover 10 that requires being filled at high speed during injection molding. Further, weight lightening of parts, reduction of material cost, and improvement of the transmittance of light rays, and the like are promoted by thinning the resin molded product.

Further, the front surface cover 10 according to the present embodiment is a part having a length direction of 450 mm. Therefore, it is possible to suppress deterioration in appearance of a large front surface cover 10 that requires being filled at high speed during injection molding.

Further, the knurled unevenness 20 is formed such that the length direction of the knurled unevenness 20 and the flowing direction of the resin 40 form an angle of 60° to 90°, preferably 70° to 90°. Therefore, a degree of freedom of arrangement or shape of steps is improved, since, even in the arrangement of steps where deterioration in appearance is likely to occur, deterioration in appearance may be suppressed.

Further, the pitch p of the knurled unevenness 20 (the uneven portion 38) may be in a range of 1 to 2 mm, and the height h of the mountain (the depth of the recess) may be in a range of 0.1 to 0.3 mm. Further, a curvature radius R1 of the knurled mountain 20a (the concave recess 38a) is 1 to 2 mm. The shape of the step is not limited to the knurled unevenness 20 (the uneven portion 38), but for example, includes a shape having unevennesses such as a longitudinal lib, a side step.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A resin molded product produced by injection molding, the resin molded product comprising:
    a gate mark formed on a non-design surface of the resin molded product; and
    an uneven step protruding from a rear surface of the resin molded product having a tangential angle of 5° to 30°,
    wherein the resin molded product has an L/t value of 185 or more where L [mm] is a flow distance of a resin from the gate mark to an end portion of the resin molded product and t [mm] is a thickness of the resin molded product.

2. The resin molded product of claim 1, wherein the uneven step is formed on a transparent design surface.

3. The resin molded product of claim 1, wherein the uneven step has a curvature radius R of 0.2 mm or more.

4. The resin molded product of claim 2, wherein the uneven step has a curvature radius R of 0.2 mm or more.

5. The resin molded product of claim 1, wherein the thickness t of the resin molded product is 1.0 mm to 2.7 mm.

6. The resin molded product of claim 2, wherein the thickness t of the resin molded product is 1.0 mm to 2.7 mm.

7. The resin molded product of claim 3, wherein the thickness t of the resin molded product is 1.0 mm to 2.7 mm.

8. The resin molded product of claim 4, wherein the thickness t of the resin molded product is 1.0 mm to 2.7 mm.

9. The resin molded product of claim 1, wherein the resin molded product is a component having a length direction of 450 mm or more.

10. The resin molded product of claim 2, wherein the resin molded product is a component having a length direction of 450 mm or more.

11. The resin molded product of claim 3, wherein the resin molded product is a component having a length direction of 450 mm or more.

12. The resin molded product of claim 4, wherein the resin molded product is a component having a length direction of 450 mm or more.

13. The resin molded product of claim 1, wherein the uneven step is configured such that an angle between a length direction of the uneven step and a flowing direction of the resin is 60° to 90°.

14. The resin molded product of claim 1 further comprising:
    a front surface portion; and an annular standing wall extending rearward from an outer periphery of the front surface,
wherein the uneven step is positioned on a rear surface of an edge portion between the front surface portion and the annular standing wall.

\* \* \* \* \*